Aug. 4, 1953 — L. H. HOVE ET AL — 2,647,635
FILTER
Filed Sept. 23, 1948 — 2 Sheets-Sheet 1

Inventors:
Leland H. Hove,
Elmer J. Hankes,
BY Manly M. Perry,

Aug. 4, 1953 — L. H. HOVE ET AL — 2,647,635

FILTER

Filed Sept. 23, 1948 — 2 Sheets-Sheet 2

Inventors:
Leland H. Hove,
Elmer J. Hankes,
By Manly M. Perry,
Attys.

Patented Aug. 4, 1953

2,647,635

UNITED STATES PATENT OFFICE 2,647,635

FILTER

Leland H. Hove, Elmer J. Hankes, and Manly M. Perry, Minneapolis, Minn., assignors to Hove Spark-O-Liner Corporation, Minneapolis, Minn., a corporation of Minnesota Application September 23, 1948, Serial No. 50,774

1 Claim. (Cl. 210—140)

This invention relates to a new and improved filter and more particularly to a filter especially adapted for filtering the water in the cooling system of a motor vehicle.

It is well known that the cooling systems of motor vehicles often become clogged to such an extent as to seriously reduce the cooling effect. The cooling passages are quite small and are easily clogged by scale, sand, rust or other material carried by the water from the engine block to the radiator. Water introduced into the system may contain foreign matter either in suspension or in solution. Material in solution may deposit on the walls of the system and, in addition to reducing effective passage areas for the water, may also have a serious insulating effect.

It has been found that it is not normally practical or desirable to insert a filter in the direct line of flow between the engine block and radiator, as the flow resistance through the filter may adversely affect the cooling action. The filter of the present invention is designed to be located adjacent the engine and cooling system and to have a portion of the cooling system water passed through the filter by the normal cooling circulation. It will be understood that where reference is made herein to water, it is intended to include any fluid used in such a system. Such fluids may include various known anti-freeze chemicals, rust inhibitors or other materials so used.

It is an object of the present invention to provide a new and improved filter for fluids.

It is a further object to provide such a filter for use in connection with the cooling systems of motor vehicles.

It is an additional object to provide a fluid filter with a removable filter cartridge comprising filtering material in a flexible fabric casing.

It is also an object to provide a filter of this character in which means are provided to prevent passage of fluid through the filter other than through the filter agent.

It is another object to provide a filter for use with cooling systems in which agents for dissolving or loosening scale or the like may be incorporated with the filter agent.

It is a further object to provide a filter having a visible sump for removed impurities and means for draining the sump.

It is an additional object to provide a filter which is simple in design and operation and adapted for commercial production and use.

Other and further objects will appear as the description proceeds.

We have shown certain preferred embodiments of our invention in the accompanying drawings, in which—

Figure 4:
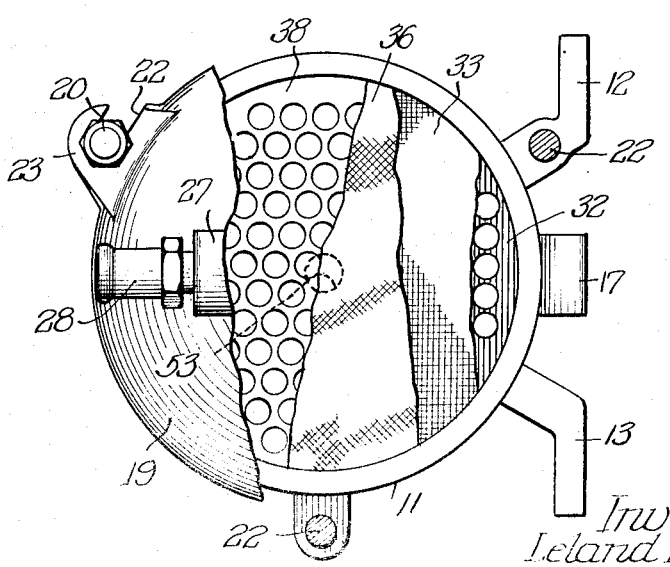
Figure 4 is a fragmentary horizontal section broken away to show the construction.

In the drawings, the filter comprises the housing or body member 11 which is provided with the rigid attaching brackets 12 and 13. The lower lug 15 carries a resilient bracket 17, this resilient bracket being provided in order to take up some of the shocks transmitted to the filter by the vibration of the motor vehicle. It will be understood that these brackets 12, 13 and 17 will ordinarily be secured to the fire wall of an automobile or truck, the filter normally being located in the engine compartment. The cover 19 is secured to the top of the body member 11 by means of bolts 20. As shown in Figure 4, these bolts 20 fit in tangentially inclined slots 22 formed in lugs 23, which lugs are integral with the cover. The cover may thus be removed by loosening the bolts and rotating the cover until the bolts clear the slots and lugs.

Figure 1:
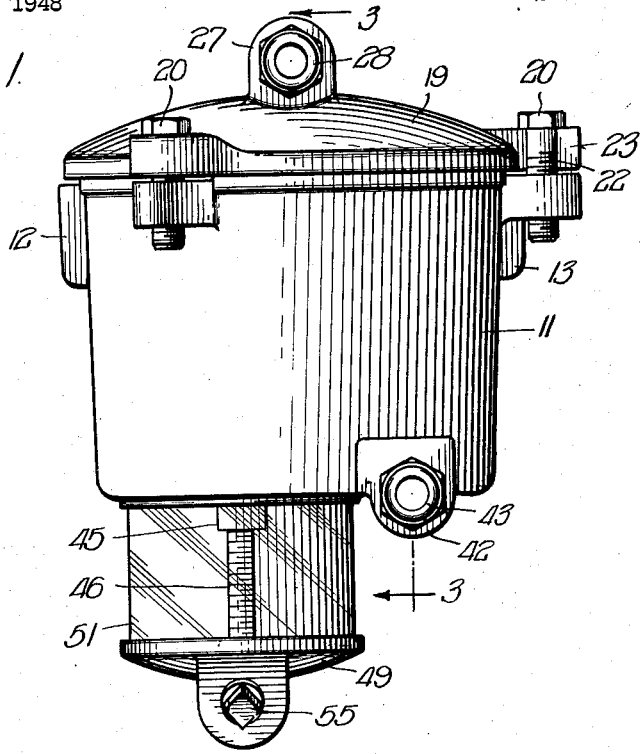
Figure 1 is an elevation of the apparatus as seen from the front.
Figure 2:
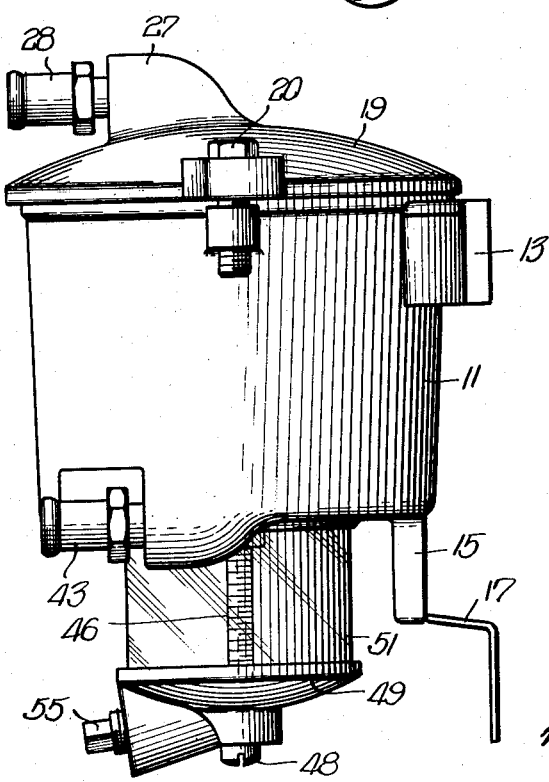
Figure 2 is an elevation of the apparatus as seen from the right of Figure 1.
Figure 3:
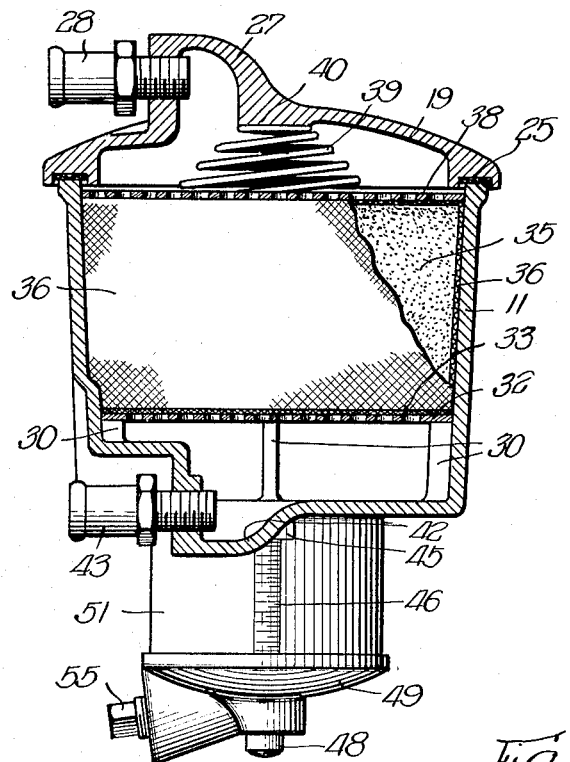
Figure 3 is a vertical cross section of the apparatus taken on line 3—3 of Figure 1.

As shown in Figure 3, a gasket 25 is secured in a groove in the cover and bears on the upper edge of the body 11. The cover has an upwardly extending portion 27 into which is threaded the coupling member 28 by means of which a hose or other tube is secured to carry off the filtered fluid from the upper portion of the filter.

The lower portion of the filter body, as shown in Figure 3, is provided with a plurality of internal lugs 30 which support a perforated plate 32. This plate then may carry, as shown in Figure 3, a fine mesh filter sheet 33 formed of fabric or other foraminous material. The filtering medium itself comprises finely divided material such as sand, shown at 35, enclosed in a fabric covering 36, this covering being of such a mesh as to permit passage of water while preventing such finely divided material from passing out.

The upper perforated plate 38 rests on the top of the filter bag and is held down by the compression spring 39, the upper portion of which is seated upon an inner extension 40 of the cover 19.

The bottom of the body member 11 has a depressed portion 42 into which is threaded the connector 43 which is similar to the upper connector 28. The outer face of the bottom of the member 11 has a threaded lug 45 into which is screwed a bolt 46, the head 48 of this bolt being located below the sump bottom member 49. The lateral wall of the sump, as shown, comprises a tubular glass member 51 which is clamped against the bottom of the body 11 by means of the member 49 and bolt 48. Suitable gaskets are provided in order to have fluid-tight joints at both ends of member 51. An opening 53, indicated in broken lines in Figure 4, leads from the inside of the bottom of the housing 11 into the sump casing 51. Trapped material may be drawn out from the sump by unscrewing the plug 55 which closes a sloping passage leading to the bottom of the sump around the bolt 46.

The exact manner in which the filter is connected into the cooling system of a motor vehicle may be varied to suit different conditions and requirements. A portion only of the fluid in the system is bypassed through the filter and the filter is not in the direct pump circuit which carries the entire cooling water flow. Preferably, the intake connection 43 is connected by a suitable hose or other flexible tube to a low point in the system and the upper connection 28 is connected to a high point in the system. The flow in the filter is upwardly into connection 43 and out through connection 28. The larger particles of material in the water, such as scale or sand, are trapped in the lower portion of the body 11 below the perforated plate 32 and filter sheet 33. The finer material is trapped in the filter body containing the finely divided material. Substantially clear fluid passes out through the top of the filter body and through the perforated plate 38. The pressure of the spring 39 aids in maintaining the fabric covering of the filter body in firm contact with the walls of the housing so as to prevent channeling of any water and its contained impurities up between the casing and filter body.

The preferred material for use in the fabric covering 36 is a clean fine grade of filter sand. This sand should be coarse enough in relation to the nature of the fabric casing 36 so that none of it will be carried from the filter into the water in the cooling system.

In order to increase the efficiency of the sand in filtering minute impurities, the sand may have mixed with it a jel-forming material such as aluminum hydroxide. In addition, the sand may have mixed with it any of the well known types of chemicals used for cleaning out cooling systems by loosening scale and other impurities. One such material comprises sodium carbonate. The materials used should be of the type which may remain in the system without harm to the metals or hose in the system. They may be placed in as a layer at the top of the filter body so that they will be dissolved and carried into the cooling system promptly after each new filter bag is installed in the filter. On the other hand, with certain types of chemicals and installations, it may be desirable to have the chemicals mixed through the sand so that they will become dissolved and pass into the system more gradually during the use of the filter.

It will be understood that the filter bags will be periodically replaced when they lose their efficiency. The number of hours of service or miles of travel at which they should be removed will be largely dependent upon the character of the water used and the condition of the cooling system surfaces when the filter is placed in use. When first placed in the cooling system of a vehicle which has had considerable use, the filter may be clogged rather rapidly and need replacement. On the other hand, when the filter has been in the system of the vehicle for some time and the system has been well cleaned out, a filter bag may last for a very considerable length of time before it requires replacement. The condition of the liquid and the amount of deposited solids in the glass sump casing 51 are visible to the person servicing the vehicle, and the plug 55 may be withdrawn whenever the car is serviced and substantial quantities of impurities are present for removal.

Another feature of the filter is its use to minimize the normal electrolytic action in a cooling system. In such systems, the water passages in the engine are ordinarily formed of ferrous metal while the heat exchange portion of the system is commonly formed of sheets of brass having a high copper content. These two metals are connected by the cooling liquid which acts as an electrolyte. The current formed is small, but has been found to have a definite adverse effect on the metals. This can be minimized by inserting certain other metals such as aluminum or magnesium, or alloys of such metals, in the system. For this reason, the filter is designed to present substantial surfaces of such metals to the liquid. This can be accomplished by making the housing 11 or the upper and lower plates 32 and 38 or any combination of them of these metals.

While we have shown and described certain preferred embodiments of our invention, these are to be understood to be illustrative only as it is capable of variation to meet differing conditions and requirements, and we contemplate such modifications as come within the spirit and scope of the appended claim.

We claim:

A filter construction for use in the cooling systems of internal combustion engines comprising a housing, a removable cover therefor, the housing having a chamber therein, lugs extending inwardly from a lower portion of the inner face of the walls of the chamber, a perforated plate seated on said lugs forming an inlet chamber in the lower portion of the housing, an inlet passage leading into the central portion of said chamber, a closed porous fabric casing containing finely divided filtering media fitting upon the perforated plate, a second perforated plate fitting in the housing chamber upon the fabric casing, a compression spring engaging the second plate and the underface of the cover to compress the fabric casing and contents between the plates, the cover having an outlet passage therein leading from the central upper portion of the chamber, a bolt extending downwardly from the bottom of the housing, a circular sump bottom member supported on the bolt, a transparent tubular sump wall held by the bottom member against the bottom of the housing, the housing bottom having an opening therein communicating with the sump, the bottom member having a discharge passage therein and a removable closure in the passage.

LELAND H. HOVE.
              ELMER J. HANKES.
              MANLY M. PERRY.

References Cited in the file of this patent
UNITED STATES PATENTS

| Number | Name | Date |
|---|---|---|
| 454,340 | Fulton | June 16, 1891 |
| 1,190,705 | Bassett | July 11, 1916 |
| 1,755,912 | Carlisle | Apr. 22, 1930 |
| 2,068,282 | Strindberg | Jan. 19, 1937 |
| 2,072,393 | Briggs | Mar. 2, 1937 |
| 2,087,136 | Andrus | July 13, 1937 |
| 2,095,407 | Baucom et al. | Oct. 12, 1937 |
| 2,130,287 | Nooney | Sept. 13, 1938 |
| 2,183,877 | Wilkinson et al. | Dec. 19, 1939 |
| 2,200,795 | Krieck | May 14, 1940 |
| 2,244,574 | Rogers | June 3, 1941 |
| 2,277,737 | Wilkinson | Mar. 31, 1942 |
| 2,278,488 | Ralston | Apr. 7, 1942 |
| 2,299,090 | Hothersall | Oct. 20, 1942 |
| 2,343,636 | Bentley | Mar. 7, 1944 |
| 2,365,492 | Pratt | Dec. 19, 1944 |
| 2,371,444 | Hubert | Mar. 13, 1945 |
| 2,424,145 | Butler | July 15, 1947 |
| 2,468,188 | Frankenhoff | Apr. 26, 1949 |